US009781540B2

(12) United States Patent
Jagannathan et al.

(10) Patent No.: US 9,781,540 B2
(45) Date of Patent: Oct. 3, 2017

(54) APPLICATION RELEVANCE DETERMINATION BASED ON SOCIAL CONTEXT

(75) Inventors: Padmapriya Jagannathan, San Diego, CA (US); Jill S. Iwasaki, San Diego, CA (US); Pooja Aggarwal, San Ramon, CA (US); Bennett M. King, San Diego, CA (US); Devarshi P. Shah, Fremont, CA (US); Roger M. Ruuspakka, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 13/177,829

(22) Filed: Jul. 7, 2011

(65) Prior Publication Data

US 2013/0014040 A1   Jan. 10, 2013

(51) Int. Cl.
*G06F 3/00* (2006.01)
*H04W 4/00* (2009.01)
(Continued)

(52) U.S. Cl.
CPC ........ *H04W 4/001* (2013.01); *G06Q 30/0201* (2013.01); *G06Q 30/0241* (2013.01);
(Continued)

(58) Field of Classification Search
CPC ............... G06F 17/00; G06F 17/30029; G06F 17/30867
(Continued)

(56) References Cited

U.S. PATENT DOCUMENTS 7,606,799 B2   10/2009   Kalinichenko et al.
8,484,217 B1 *  7/2013   Srivastava ........ G06F 17/30864
                                                              707/738
(Continued)

FOREIGN PATENT DOCUMENTS

CN   1527636 A    9/2004
DE   19846596 A1  4/1999
(Continued)

OTHER PUBLICATIONS

Bauer et al., "Exploring the Design Space of Context-aware Recommender Systems that Suggest Mobile Applicationas", CARS—10, Sep. 26, 2010, Barselona, Spain. (5 pages).
(Continued)

*Primary Examiner* — Daeho Song
(74) *Attorney, Agent, or Firm* — Charles E. Eggers

(57) ABSTRACT

Systems, methods, devices, and computer program products are described for using context-aware recommendation techniques to facilitate content discovery on a mobile device platform. In particular, the context-aware recommendation techniques evaluate both a current device context and a social context to generate application relevance scores for each of a number of applications downloaded to a mobile device. Application representations on a graphical user interface (GUI) of the mobile device are rearranged, resized, and/or otherwise affected according to their respective application relevance scores. In certain configurations, one or more applications are pinned, thereby altering (e.g., reducing or eliminating) how changes in their respective application relevance scores affect display of their respective application representations on the GUI of the mobile device.

41 Claims, 9 Drawing Sheets

(51) Int. Cl.
| | |
|---|---|
| *G06Q 50/00* | (2012.01) |
| *H04M 1/725* | (2006.01) |
| *G06Q 30/02* | (2012.01) |
| *H04W 4/02* | (2009.01) |
| *H04L 29/08* | (2006.01) |

(52) U.S. Cl.
CPC ............ *G06Q 50/01* (2013.01); *H04L 67/00* (2013.01); *H04M 1/72525* (2013.01); *H04M 1/72563* (2013.01); *H04M 1/72566* (2013.01); *H04M 1/72569* (2013.01); *H04M 1/72572* (2013.01); *H04M 1/72586* (2013.01); *H04L 67/22* (2013.01); *H04W 4/02* (2013.01); *H04W 4/028* (2013.01)

(58) Field of Classification Search
USPC ................................................ 715/765, 745
See application file for complete search history.

(56) References Cited

U.S. PATENT DOCUMENTS

| | | | |
|---|---|---|---|
| 2002/0198991 A1* | 12/2002 | Gopalakrishnan ........................ G06F 17/30902 709/225 |
| 2004/0185874 A1 | 9/2004 | Kim et al. |
| 2007/0083827 A1* | 4/2007 | Scott ...................... G06F 9/4443 715/811 |
| 2007/0179945 A1* | 8/2007 | Marston ............... G06Q 10/107 |
| 2007/0209069 A1* | 9/2007 | Saklikar ............. H04L 63/1433 726/14 |
| 2008/0077529 A1* | 3/2008 | Swanburg .............. G06Q 10/00 705/45 |
| 2008/0208973 A1* | 8/2008 | Hayashi ............ G06F 17/30867 709/204 |
| 2009/0049525 A1* | 2/2009 | D'Angelo ........... G06F 21/6245 726/4 |
| 2009/0144634 A1 | 6/2009 | Berger |
| 2009/0150541 A1 | 6/2009 | Georgis |
| 2009/0199134 A1 | 8/2009 | Murayama |
| 2010/0076777 A1* | 3/2010 | Paretti .................... G06Q 30/02 705/1.1 |
| 2010/0082693 A1* | 4/2010 | Hugg .............. H04M 1/274583 707/798 |
| 2010/0138491 A1* | 6/2010 | Churchill ............... G06Q 50/00 709/204 |
| 2010/0153970 A1* | 6/2010 | Sathish ............. G06F 17/30867 719/316 |
| 2010/0159909 A1 | 6/2010 | Stifelman |
| 2010/0231383 A1 | 9/2010 | Levine et al. |
| 2010/0305855 A1* | 12/2010 | Dutton .................... H04W 4/02 701/469 |
| 2011/0057790 A1* | 3/2011 | Martin .................. G06Q 10/109 340/539.13 |
| 2011/0060807 A1* | 3/2011 | Martin ................ G06F 17/3087 709/217 |
| 2011/0060808 A1* | 3/2011 | Martin ................ G06F 17/3087 709/217 |
| 2011/0191352 A1* | 8/2011 | Jones ...................... G06F 17/30 707/749 |
| 2011/0202542 A1* | 8/2011 | Phillips .................. G06Q 10/06 707/749 |
| 2011/0208753 A1* | 8/2011 | Sivadas ............ G06F 17/30864 707/749 |
| 2011/0225291 A1* | 9/2011 | Dobroth .................. G06Q 10/10 709/224 |
| 2011/0289015 A1* | 11/2011 | Mei ........................ G06Q 10/04 705/347 |
| 2011/0295709 A1* | 12/2011 | Kubo ................. G06Q 30/0601 705/26.1 |
| 2011/0320536 A1* | 12/2011 | Lobb ..................... G06Q 50/01 709/205 |
| 2012/0042036 A1* | 2/2012 | Lau .......................... G06F 8/61 709/217 |
| 2012/0117499 A1* | 5/2012 | Mori ................. H04M 1/72569 715/765 |
| 2012/0159383 A1* | 6/2012 | Matthews ......... G06F 17/30899 715/788 |
| 2012/0166377 A1* | 6/2012 | Sathish .................. G06Q 10/00 706/47 |
| 2012/0173316 A1* | 7/2012 | Stephans ............ G06Q 30/0241 705/14.4 |
| 2013/0038636 A1* | 2/2013 | Fujiwaka .............. G06F 1/1643 345/681 |
| 2015/0135098 A1 | 5/2015 | Geppert et al. |

FOREIGN PATENT DOCUMENTS

| | | |
|---|---|---|
| EP | 1455491 A1 | 9/2004 |
| EP | 1465392 A2 | 10/2004 |
| JP | 2004274767 A | 9/2004 |
| JP | 2005071026 A | 3/2005 |
| JP | 2008287693 A | 11/2008 |
| JP | 2009080785 A | 4/2009 |
| JP | 2009181501 A | 8/2009 |
| JP | 2010537283 A | 12/2010 |
| JP | 2011041247 A | 2/2011 |
| JP | 2011044129 A | 3/2011 |
| JP | 2011108005 A | 6/2011 |
| KR | 100706057 B1 | 4/2007 |
| WO | 02089342 A1 | 11/2002 |
| WO | 03014978 A2 | 2/2003 |
| WO | 2009023790 A1 | 2/2009 |
| WO | 2009120597 | 10/2009 |
| WO | 2010071843 A1 | 6/2010 |

OTHER PUBLICATIONS

Dey et al., "Context-Awareness and Mobile Devices" (Chapter XIII), 2008. pp. 205-217.
Coppola, P., et al., "Information Filtering and Retrieving of Context-Aware Applications Within the MoBe Framework", Jul. 5, 2005 (Jul. 5, 2005), pp. 1-14, XP55060834.
International Search Report and Written Opinion—PCT/US2012/045470—ISA/EPO—May 10, 2013.
Partial International Search Report—PCT/US2012/045470—ISA/EPO—Mar. 21, 2013.
Hakkila, Jonna, "Human Computer Interaction in Context Aware Mobile Handheld Devices", In Processing Laboratory of Interaction, University of Oulu, Finland (2003).

* cited by examiner

APPLICATION RELEVANCE DETERMINATION BASED ON SOCIAL CONTEXT

BACKGROUND

Mobile client devices are becoming increasingly ubiquitous, and users are increasingly using these devices to access communications services and a myriad of applications. As the number of applications downloaded by users increases, various techniques have been employed to help users manage and access those applications in an efficient way. For example, many mobile devices allow users to group, filter, and/or otherwise arrange mobile applications so as to minimize the number of "clicks" (interactions with the mobile device interface) needed to access most desired applications.

More recently, certain mobile platforms have begun using recommendation techniques to provide users with application suggestions based on certain parameters. For example, recommendations may be based on other applications the user has, user-provided preferences and ratings, etc. For many users, however, the desirability of different applications changes with their current context (e.g., where they are, what they are doing, etc.). Accordingly, context-aware recommendation techniques can be used to improve user experiences with their mobile devices by providing more efficient content discovery, particularly when the user has downloaded many applications to the device.

SUMMARY

The present disclosure is directed to systems and methods for using context-aware recommendation techniques to facilitate content discovery on a mobile device platform. In particular, the context-aware recommendation techniques evaluate both a current device context and a social context to generate application relevance scores for each of a number of applications downloaded to a mobile device. Application representations (e.g., icons) on a graphical user interface (GUI) of the mobile device are rearranged, resized, and/or otherwise affected according to their respective application relevance scores. In certain configurations, one or more applications are pinned, thereby altering (e.g., reducing or eliminating) how changes in their respective application relevance scores affect display of their respective application representations on the GUI of the mobile device.

An example of a method according to the disclosure includes determining a current device context value of at least one of multiple device context parameters generated according to a dynamic characteristic of a mobile device of a user; determining a current social context value of at least one of multiple social context parameters generated according to dynamic information relating to a social contact of the user maintained as part of a social application accessible by the mobile device; for each of multiple applications downloaded to the mobile device, calculating an application relevance score as a function of the current device context value and the current social context value; and dynamically updating display of multiple application representations on a graphical user interface (GUI) of the mobile device, such that the application representations are arranged according at least to the application relevance scores, each application representation corresponding to one of the multiple applications downloaded to the mobile device.

Implementations of such a method may include one or more of the following features. Calculating the application relevance score as a function of the current device context value and the current social context value includes calculating a weighted combination of at least the current device context value and the current social context value for each of the multiple applications downloaded to the mobile device. Determining the current device context value includes receiving substantially real-time data from a sensor integrated with the mobile device. The at least one device context parameter relates to at least one of current geographical location of the mobile device, current network usage, current application usage or current time. The at least one device context parameter relates to at least one of current geographical location of the mobile device in relation to a past geographical location of the mobile device or current application usage in relation to past application usage. Determining the current social context value includes receiving substantially real-time data at the mobile device from a social networking application over a communications network. The at least one social context parameter relates to at least one of an entry in a calendar application associated with the user or contact history. The at least one social context parameter relates to at least one of an entry in a calendar application associated with a social contact, an update received via a social networking application, application usage information contextualized according to geographic location of a social contact, application usage information contextualized according to application usage of a social contact or current geographical location of the mobile device in relation to geographical location of a social contact.

Implementations of such a method may additionally or alternatively include one or more of the following features. Dynamically updating display of the multiple application representations on the GUI of the mobile device includes reordering at least some of the application representations. Dynamically updating display of the multiple application representations on the GUI of the mobile device includes resizing at least some of the application representations. The GUI includes a primary screen and at least one secondary screen, and dynamically updating display of the multiple application representations on the GUI includes determining a subset of the multiple applications downloaded to the mobile device that have highest application relevance scores and arranging the application representations according at least to the application relevance scores by displaying the application representations corresponding to the subset of applications on the primary screen of the GUI. Identifying at least one of the multiple applications as a pinned application, where the display of the multiple application representations on the GUI is dynamically updated, such that the application representations are arranged according at least to the application relevance scores without affecting arrangement of the application representation corresponding to the pinned application. At least one application representation is an icon representing the corresponding application.

Another example of a method according to the disclosure includes determining a current device context value of at least one of multiple device context parameters generated according to a dynamic characteristic of a mobile device of a user; determining a current social context value of at least one of multiple social context parameters generated according to dynamic information relating to a social contact of the user maintained as part of a social application accessible by the mobile device; calculating an application relevance score as a function of the current device context value and the current social context value for a designated application of multiple applications downloaded to the mobile device; automatically executing the designated application on the mobile device when the application relevance score is calculated to be above a predetermined threshold value; and automatically stopping the designated application on the mobile device when the application relevance score is calculated to be below a predetermined threshold value.

Implementations of such a method may include one or more of the following features. Determining the current device context value includes receiving substantially real-time data from a sensor integrated with the mobile device. The at least one social context parameter relates to at least one of an entry in a calendar application associated with the user, an entry in a calendar application associated with a social contact, contact history, an update received via a social networking application, application usage information contextualized according to geographic location of a social contact, application usage information contextualized according to application usage of a social contact or current geographical location of the mobile device in relation to geographical location of a social contact. Application relevance scores are calculated for all of the multiple applications, and the designated application is automatically executed on the mobile device when the application relevance score for the designated application is calculated to be above the application relevance scores for the other of the multiple applications. A subset of the multiple applications is designated as automatically executable applications, the subset includes the designated application, and applications not part of the subset cannot be automatically executed according to their respective application relevance scores.

An example of a system according to the disclosure includes a device context determination engine configured to determine a current device context value of at least one of multiple device context parameters generated according to a dynamic characteristic of a mobile device of a user; a social context determination engine configured to determine a current social context value of at least one of multiple social context parameters generated according to dynamic information relating to a social contact of the user maintained as part of a social application accessible by the mobile device; a data store configured to store multiple application representations, each corresponding to one of multiple applications downloaded to the mobile device; a scoring engine, communicatively coupled with the device context determination engine and the social context determination engine, and configured, for each of the multiple applications downloaded to the mobile device, to calculate an application relevance score as a function of the current device context value and the current social context value; and a display engine, communicatively coupled with the data store, the scoring engine, and a display integrated with the mobile device, and configured to dynamically update the display to show at least some of the multiple application representations on a GUI of the mobile device, such that the application representations are arranged according at least to the application relevance scores.

Implementations of such a system may include one or more of the following features. The device context determination engine is configured to determine the current device context value by receiving substantially real-time data from a sensor integrated with the mobile device. The social context determination engine is configured to determine the current social context value by receiving substantially real-time data at the mobile device from a social networking application over a communications network. The GUI includes a primary screen and at least one secondary screen, and the display engine is configured to dynamically update display of the multiple application representations on the GUI by determining a subset of the multiple applications downloaded to the mobile device that have highest application relevance scores and arranging the application representations according at least to the application relevance scores by displaying the application representations corresponding to the subset of applications on the primary screen of the GUI. The display engine is configured to dynamically update display of the multiple application representations on the GUI, such that the application representations are arranged according at least to the application relevance scores without affecting arrangement of at least one application representation corresponding to an application identified as a pinned application.

Another example of a system according to the disclosure includes a device context determination engine configured to determine a current device context value of at least one of multiple device context parameters generated according to a dynamic characteristic of a mobile device of a user; a social context determination engine configured to determine a current social context value of at least one of multiple social context parameters generated according to dynamic information relating to a social contact of the user maintained as part of a social application accessible by the mobile device; a data store configured to store multiple applications downloaded to the mobile device; a scoring engine, communicatively coupled with the device context determination engine and the social context determination engine, and configured to calculate an application relevance score as a function of the current device context value and the current social context value for a designated application of the multiple applications downloaded to the mobile device; and an execution engine, communicatively coupled with the data store and the scoring engine, and configured to automatically execute the designated application on the mobile device when the application relevance score is calculated to be above a predetermined threshold value and to automatically stop the designated application on the mobile device when the application relevance score is calculated to be below a predetermined threshold value.

Implementations of such a system may include one or more of the following features. The device context determination engine is configured to determine the current device context value by receiving substantially real-time data from a sensor integrated with the mobile device. The scoring engine is configured to calculate application relevance scores for all of the multiple applications, and the execution engine is configured to automatically execute the designated application on the mobile device when the application relevance score for the designated application is calculated to be above the application relevance scores for the other of the multiple applications. At least some of the multiple applications are configured to be designated as automatically executable applications, the designated application is designated as an automatically executable application, and applications not designated as automatically executable applications cannot be automatically executed according to their respective application relevance scores.

An example of a processor according to the disclosure includes a device context determination controller configured to determine a current device context value of at least one of multiple device context parameters generated according to a dynamic characteristic of a mobile device of a user; a social context determination controller configured to determine a current social context value of at least one of multiple social context parameters generated according to dynamic information relating to a social contact of the user maintained as part of a social application accessible by the mobile device; a scoring controller, communicatively coupled with the device context determination engine and the social context determination engine, and configured, for each of multiple applications downloaded to the mobile device, to calculate an application relevance score as a function of the current device context value and the current social context value; and a display controller, communicatively coupled with the scoring engine and a display integrated with the mobile device, and configured to dynamically update the display to show at least some of multiple application representations on a GUI of the mobile device, such that the application representations are arranged according at least to the application relevance scores, each application representation corresponding to one of the multiple applications downloaded to the mobile device.

Implementations of such a processor may include one or more of the following features. The device context determination controller is configured to determine the current device context value by receiving substantially real-time data from a sensor integrated with the mobile device. The social context determination controller is configured to determine the current social context value by receiving substantially real-time data at the mobile device from a social networking application over a communications network. The GUI includes a primary screen and at least one secondary screen, and the display controller is configured to dynamically update display of the multiple application representations on the GUI by determining a subset of the multiple applications downloaded to the mobile device that have highest application relevance scores and arranging the application representations according at least to the application relevance scores by displaying the application representations corresponding to the subset of applications on the primary screen of the GUI. The display controller is configured to dynamically update display of the multiple application representations on the GUI, such that the application representations are arranged according at least to the application relevance scores without affecting arrangement of at least one application representation corresponding to an application identified as a pinned application.

Another example of a processor according to the disclosure includes a device context determination controller configured to determine a current device context value of at least one of multiple device context parameters generated according to a dynamic characteristic of a mobile device of a user; a social context determination controller configured to determine a current social context value of at least one of multiple social context parameters generated according to dynamic information relating to a social contact of the user maintained as part of a social application accessible by the mobile device; a scoring controller, communicatively coupled with the device context determination engine and the social context determination engine, and configured to calculate an application relevance score as a function of the current device context value and the current social context value for a designated application of multiple applications downloaded to the mobile device; and an execution controller, communicatively coupled with the scoring engine, and configured to automatically execute the designated application on the mobile device when the application relevance score is calculated to be above a predetermined threshold value and to automatically stop the designated application on the mobile device when the application relevance score is calculated to be below a predetermined threshold value.

Implementations of such a processor may include one or more of the following features. The device context determination controller is configured to determine the current device context value by receiving substantially real-time data from a sensor integrated with the mobile device.

An example of a computer program product according to the disclosure resides on a non-transitory processor-readable medium and includes processor-readable instructions, which, when executed, cause a processor to perform steps including determining a current device context value of at least one of multiple device context parameters generated according to a dynamic characteristic of a mobile device of a user; determining a current social context value of at least one of multiple social context parameters generated according to dynamic information relating to a social contact of the user maintained as part of a social application accessible by the mobile device; for each of multiple applications downloaded to the mobile device, calculating an application relevance score as a function of the current device context value and the current social context value; and dynamically updating display of multiple application representations on a GUI of the mobile device, such that the application representations are arranged according at least to the application relevance scores, each application representation corresponding to one of the multiple applications downloaded to the mobile device.

Implementations of such a computer program product may include one or more of the following features. Calculating the application relevance score as a function of the current device context value and the current social context value includes calculating a weighted combination of at least the current device context value and the current social context value for each of the multiple applications downloaded to the mobile device. Determining the current device context value includes receiving substantially real-time data from a sensor integrated with the mobile device. Determining the current social context value includes receiving substantially real-time data at the mobile device from a social networking application over a communications network. The GUI includes a primary screen and at least one secondary screen, and dynamically updating display of the multiple application representations on the GUI includes determining a subset of the multiple applications downloaded to the mobile device that have highest application relevance scores and arranging the application representations according at least to the application relevance scores by displaying the application representations corresponding to the subset of applications on the primary screen of the GUI. The processor-readable instructions, when executed, cause the processor to perform steps further including identifying at least one of the multiple applications as a pinned application, where the display of the multiple application representations on the GUI is dynamically updated, such that the application representations are arranged according at least to the application relevance scores without affecting arrangement of the application representation corresponding to the pinned application.

Another example of a computer program product according to the disclosure resides on a non-transitory processor-readable medium and includes processor-readable instructions, which, when executed, cause a processor to perform steps including determining a current device context value of at least one of multiple device context parameters generated according to a dynamic characteristic of a mobile device of a user; determining a current social context value of at least one of multiple social context parameters generated according to dynamic information relating to a social contact of the user maintained as part of a social application accessible by the mobile device; calculating an application relevance score as a function of the current device context value and the current social context value for a designated application of multiple applications downloaded to the mobile device; automatically executing the designated application on the mobile device when the application relevance score is calculated to be above a predetermined threshold value; and automatically stopping the designated application on the mobile device when the application relevance score is calculated to be below a predetermined threshold value.

Implementations of such a computer program product may include one or more of the following features. Determining the current device context value includes receiving substantially real-time data from a sensor integrated with the mobile device.

An example of a system according to the disclosure includes means for determining a current device context value of at least one of multiple device context parameters generated according to a dynamic characteristic of a mobile device of a user; means for determining a current social context value of at least one of multiple social context parameters generated according to dynamic information relating to a social contact of the user maintained as part of a social application accessible by the mobile device; for each of multiple applications downloaded to the mobile device, means for calculating an application relevance score as a function of the current device context value and the current social context value; and means for dynamically updating display of multiple application representations on a GUI of the mobile device, such that the application representations are arranged according at least to the application relevance scores, each application representation corresponding to one of the multiple applications downloaded to the mobile device.

Implementations of such a system may include one or more of the following features. The means for calculating the application relevance score as a function of the current device context value and the current social context value includes means for calculating a weighted combination of at least the current device context value and the current social context value for each of the multiple applications downloaded to the mobile device. The means for determining the current device context value includes means for receiving substantially real-time data from a sensor integrated with the mobile device. The means for determining the current social context value includes means for receiving substantially real-time data at the mobile device from a social networking application over a communications network. The GUI includes a primary screen and at least one secondary screen, and the means for dynamically updating display of the multiple application representations on the GUI includes means for determining a subset of the multiple applications downloaded to the mobile device that have highest application relevance scores and means for arranging the application representations according at least to the application relevance scores by displaying the application representations corresponding to the subset of applications on the primary screen of the GUI. Means for identifying at least one of the multiple applications as a pinned application, where the display of the multiple application representations on the GUI is dynamically updated, such that the application representations are arranged according at least to the application relevance scores without affecting arrangement of the application representation corresponding to the pinned application.

Another example of a system according to the disclosure includes means for determining a current device context value of at least one of multiple device context parameters generated according to a dynamic characteristic of a mobile device of a user; means for determining a current social context value of at least one of multiple social context parameters generated according to dynamic information relating to a social contact of the user maintained as part of a social application accessible by the mobile device; means for calculating an application relevance score as a function of the current device context value and the current social context value for a designated application of multiple applications downloaded to the mobile device; means for automatically executing the designated application on the mobile device when the application relevance score is calculated to be above a predetermined threshold value; and means for automatically stopping the designated application on the mobile device when the application relevance score is calculated to be below a predetermined threshold value.

Implementations of such a system may include one or more of the following features. The means for determining the current device context value includes means for receiving substantially real-time data from a sensor integrated with the mobile device.

The foregoing has outlined rather broadly the features and technical advantages of examples according to disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

A further understanding of the nature and advantages of examples provided by the disclosure may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

DETAILED DESCRIPTION

Figure 1:
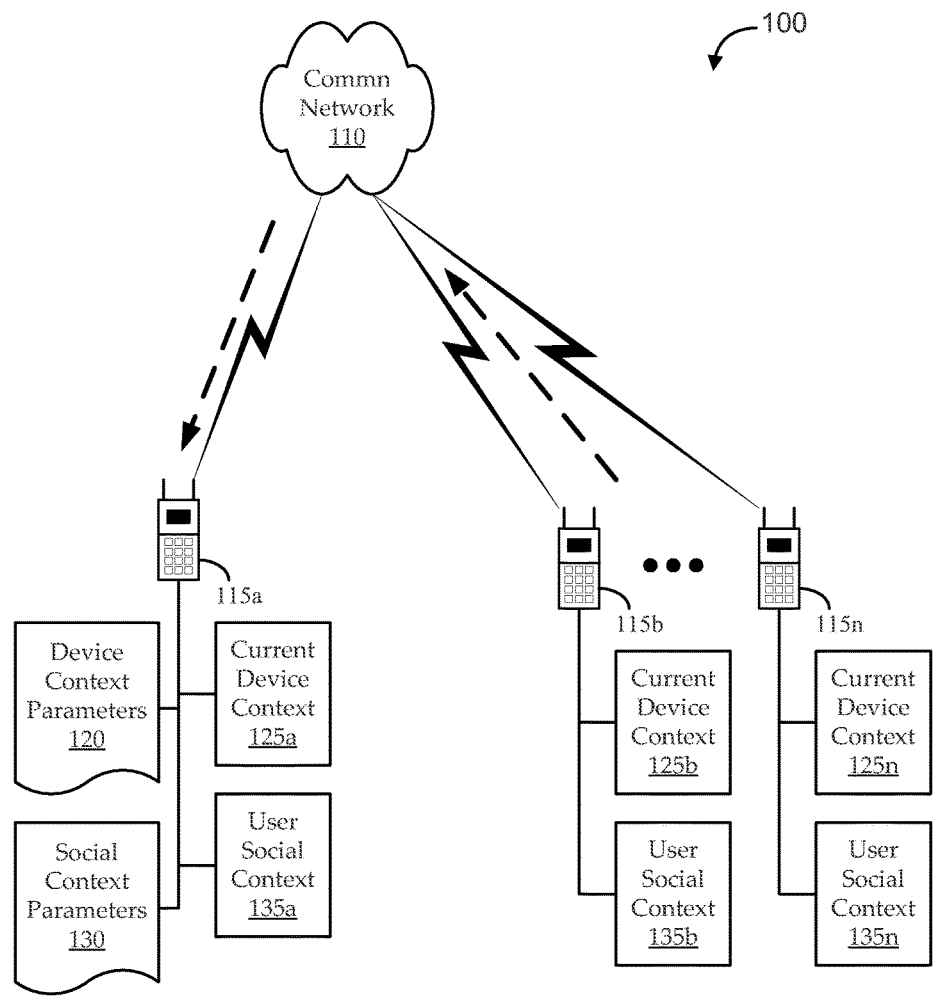
FIG. 1 shows a simplified diagram of a communications environment.

The present disclosure is directed to systems and methods for using context-aware recommendation techniques to facilitate content discovery on a mobile device platform. In particular, the context-aware recommendation techniques evaluate both a current device context and a social context to generate application relevance scores for each of a number of applications downloaded to a mobile device. Application representations (e.g., icons) on a graphical user interface (GUI) of the mobile device are rearranged, resized, and/or otherwise affected according to their respective application relevance scores. In certain configurations, one or more applications are pinned, thereby altering (e.g., reducing or eliminating) how changes in their respective application relevance scores affect display of their respective application representations on the GUI of the mobile device.

When a user downloads many applications to their mobile devices, it can become difficult for the user to efficiently access any one application. For example, the user may have to scroll through numerous icons, folder, screens, etc. to find a desired application, which may be frustrating and time consuming for the user. Many techniques are available for helping users more efficiently interact with content downloaded to a mobile device. For example, many mobile device platforms provide a "home screen," a "dashboard," shortcut keys, shortcut gestures, and/or other options for more efficient content discovery from among multiple applications on the device.

In many cases, however, it is desirable to dynamically affect presentation of the available content to effectively recommend content to the user. For example, it may be desirable to automatically remove an icon from a home screen if it is not used for a certain amount of time, to reorder icons according to frequency of use, to list most recently used applications in a designated user interface location, etc. These recommendations may be made based on implicit types of information (e.g., tracking application usage) and/or explicit types of information (e.g., prompting the user for preferences or ratings).

As described more fully herein, techniques use various types of information to evaluate dynamic contextual parameters of the mobile device platform. The contextual parameters relate to both device context and social context, and are used to score the relevance of content available to the user via the mobile device. Content presentation to the user is dynamically affected according to changes in the relevance scores. For example, application icons are reordered, application visualizations are resized or rearranged, or applications are automatically executed according to changes in relevance scores.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above, as well as for other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various operations may be added, omitted, or combined. Also, features described with respect to certain examples may be combined in other examples.

Referring first to FIG. 1, a simplified diagram of a communications environment 100 is shown. The communications environment 100 includes a number of client devices 115 in communication with a communications network 110. The communications network 110 is simplified as a single cloud, but may include any number of public, private, wired, wireless, and/or other networks. The client devices 115 may have any of various configurations, such as personal computers (e.g., laptop computers, netbook computers, tablet computers, etc.), cellular telephones, PDAs, digital video recorders (DVRs), internet appliances, gaming consoles, e-readers, etc.

As used herein, there is assumed to be a "user" and "social contacts" of the user. The user is a particular user of interest from whose perspective various techniques herein are described. For example, application recommendations are intended for the user. The social contacts of the user include friends, colleagues, and/or any other users that may affect the social context of the user, as described more fully below. As illustrated in FIG. 1, client device 115a is assumed to be the user's device, while client devices 115b-n are assumed to be devices of the user's social contacts. Client device 115a (the user's device) is assumed further to be a mobile device being used at least sometimes in a mobile context. Client devices 115b-n may be any types of devices, including mobile and non-mobile devices.

Each client device is associated with a device context 125 and a social context 135. In general, the device context 125 relates to a current state of one or more dynamic characteristics of the device, the device platform, or device content.

Certain types of device context 125 may include information that can be derived from one or more sensors or transceivers, like a current Internet Protocol address of a subnet in which the device is participating, global positioning satellite (GPS) location information, time of day, temperature, speed, altitude, humidity, pressure, ambient noise, ambient lighting, current connection speed and/or data integrity, etc. Other types of device context 125 may relate to application usage, such as what applications are in use, in what ways, and to what extent. Still other types of device context 125 may include static device parameters, such as device identifiers, display size or resolution, interface capabilities (e.g., is there a single-touch or multi-touch screen interface), etc.

In general, for the perspective of the user, the social context 135 relates to one or more of social content of the user, device context 125 of one or more social contact client devices 115$b$-$n$, or social context 135 of one or more social contact client devices 115$b$-$n$. For example, social content of the user may provide social context 135, such as contact lists and information, user calendar entries, user contact histories (e.g., who the user has contacted, what contact methods were used, how often certain contacts are made, most recent contacts, etc.), context provided by the user to social networking applications, etc. Device context 125 of one or more social contact client devices 115$b$-$n$ may provide social context 135, such as geographic locations of social contacts, temperature at social contact locations, current or historical application usage by social contacts, etc. Social context 135 of one or more social contact client devices 115$b$-$n$ may provide social context 135 to the user, such as posts (e.g., blog postings, status updates, reviews and recommendations, etc.) by social contacts to social networking and other applications, calendar entries of social contacts, etc.

One or more types of device context 125 information can be used to generate values for one or more device context parameters 120. Similarly, one or more types of social context 135 information can be used to generate one or more social context parameters 130. The device context parameters 120 and the social context parameters 130 are configured to dynamically capture changes in the underlying context information.

In many typical scenarios, the desirability of an application to the user changes with context. For example, the user may tend to use certain applications when at home, but use different applications when at work or while traveling. Further, a user may tend to use different applications when proximate to certain social contacts, in response to postings by those contacts, etc. Accordingly, embodiments dynamically affect which applications are recommended (e.g., presented) to the user and in what form (e.g., size, format, execution, etc.) according to the device context parameters 120 and the social context parameters 130 of the user's client device 115.

Figure 2:
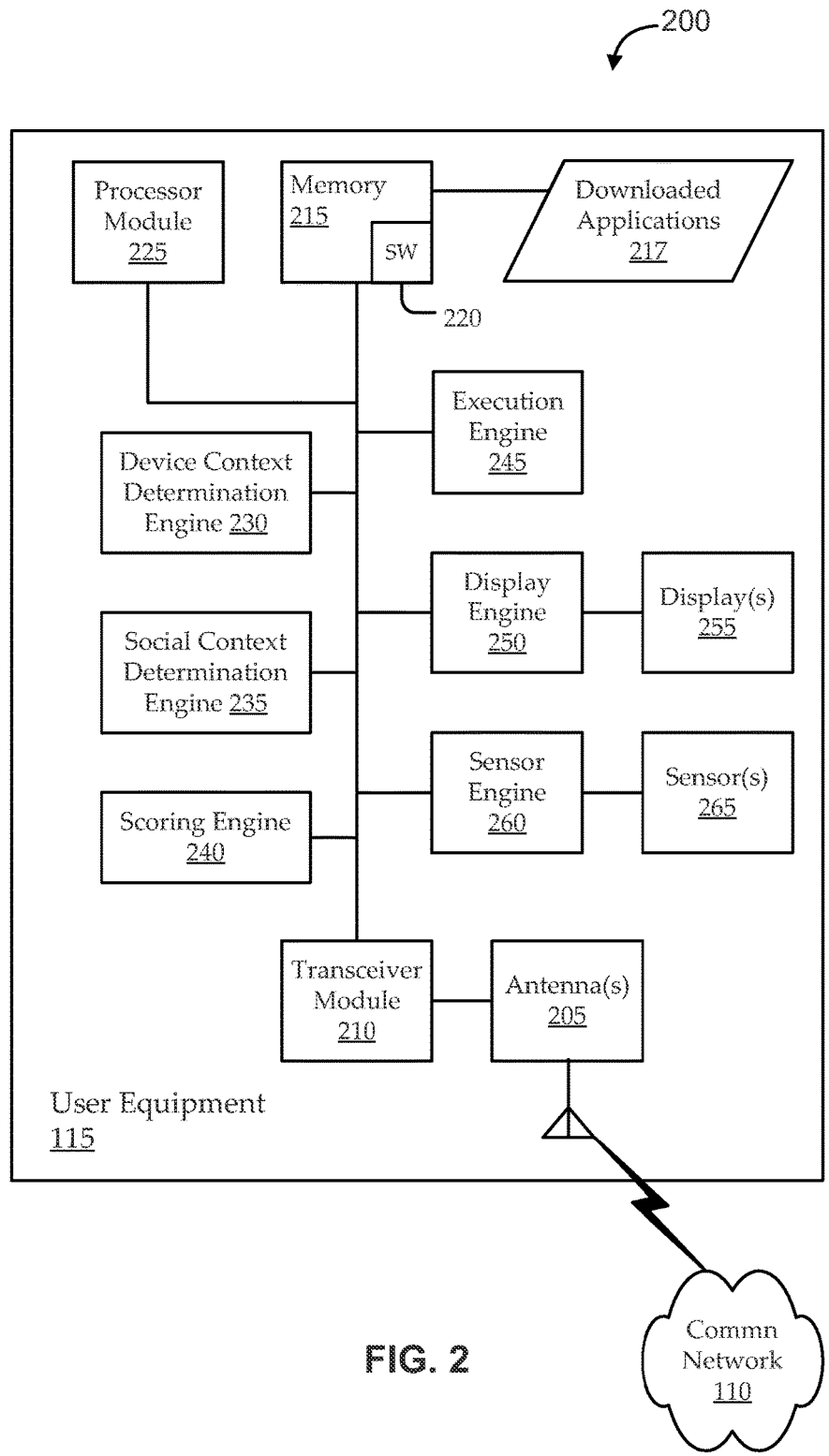
FIG. 2 shows an illustrative client device for implementing context-aware application relevance determination functionality.

FIG. 2 shows an illustrative client device 115 for implementing context-aware application relevance determination functionality. The client device 115 includes a transceiver module 210 in communication with one or more antennae 205, memory 215 configured to support software 220, a processor module 225, and a number of functional engines. Some or all of the elements of the client device 115 are in communication via bus or in any other useful way.

Configurations of the transceiver module 210 implement functionality for bidirectional communications with one or more communications networks 110. For example, the transceiver module 210 is used to send and receive information over the Internet, over cellular and/or wireless wide area networks (WWANs), etc. In support of functionality described herein the transceiver module 210 may be used to download applications to the client device 115 and/or to communicate social contact device context 125 and/or social context 135 information.

The memory 215 may include random access memory (RAM) and/or read-only memory (ROM). The memory 215 may store computer-readable, computer-executable software code 220 containing instructions that are configured to, when executed, cause the processor module 225 to perform various functions described herein (e.g., call processing, database management, message routing, application recommendation, etc.). Alternatively, the software 220 may not be directly executable by the processor module 225 but be configured to cause the computer, e.g., when compiled and executed, to perform functions described herein. The memory 210 may be used to store a number of downloaded applications 217 (e.g., and application representations, as described more fully below).

The processor module 225 may include an intelligent hardware device (e.g., a central processing unit (CPU) such as those made by Intel® Corporation or AMD®, a microcontroller, an application specific integrated circuit (ASIC), etc.). The processor module 225 may include a speech encoder (not shown) configured to receive audio via a microphone, convert the audio into packets (e.g., 30 ms in length) representative of the received audio, provide the audio packets to one or more of the communications subsystems, and provide indications of whether a user is speaking. Alternatively, an encoder may only provide packets to the communications subsystems, with the provision or withholding/suppression of the packet itself providing the indication of whether a user is speaking. In some configurations, the processor is used to support functionality of one or more of the functional engines.

The functional engines may be implemented as individual or integrated modules, or in any other useful way. As illustrated, the functional engines include a device context determination engine 230, a social context determination engine 235, a scoring engine 240, an execution engine 245, a display engine 250, and a sensor engine 260. The display engine 250 is in communication with one or more displays 255, and the sensor engine 260 is in communication with one or more sensors 265.

Figure 3:
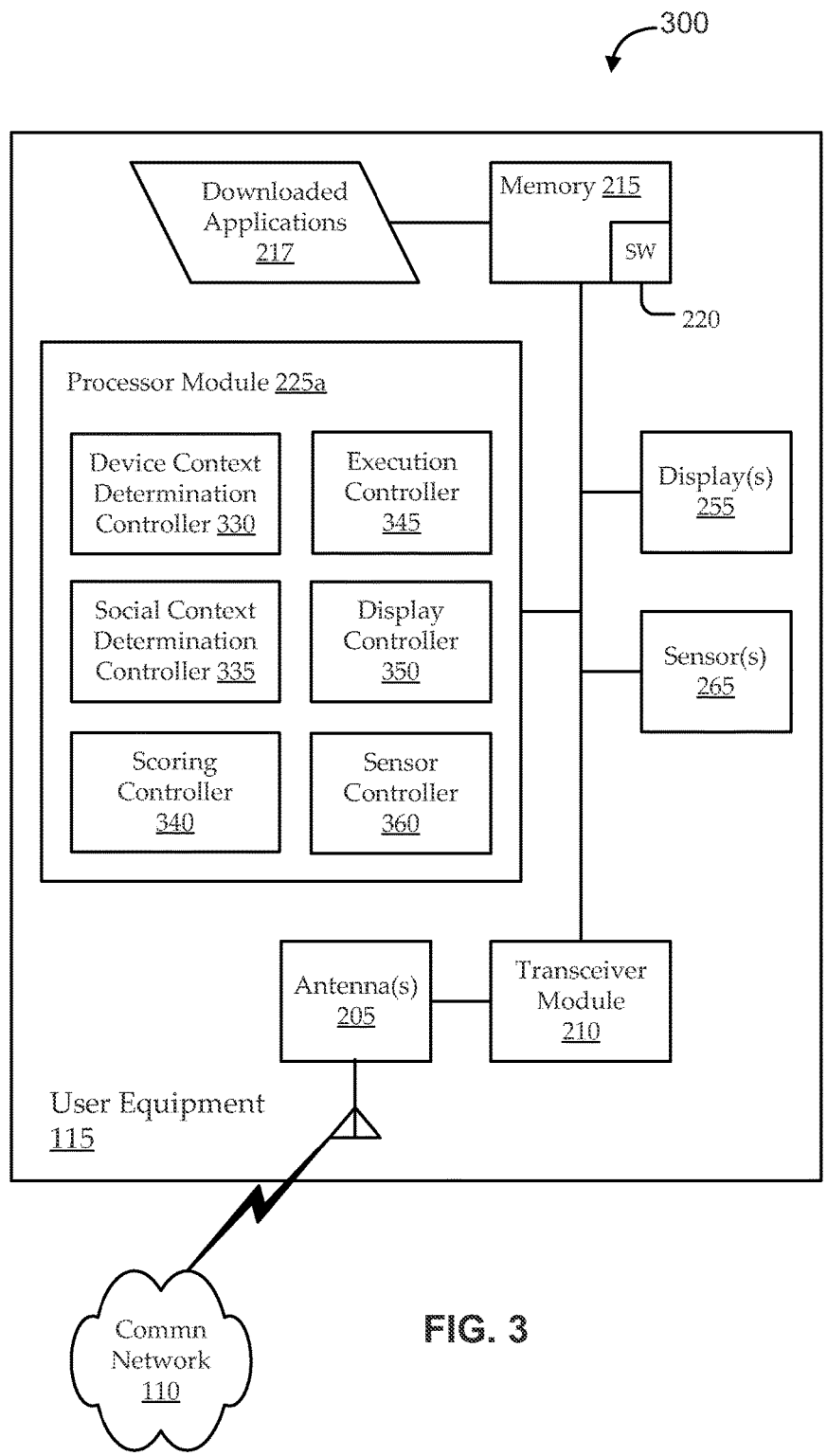
FIG. 3 shows a block diagram of another configuration of a client device for implementing context-aware application relevance determination functionality.

FIG. 3 shows a block diagram 300 of another configuration of a client device 115 for implementing context-aware application relevance determination functionality. The configuration of the client device 115 illustrated in FIG. 3 provides similar or identical functionality to the configuration of the client device 115 illustrated in FIG. 2, except that much of the functionality is implemented as controllers of the processor module 225*a*, rather than as engines. Like the client device 115 of FIG. 2, the client device 115 of FIG. 3 includes a transceiver module 210 in communication with one or more antennae 205, memory 215 configured to support software 220, displays 255, and sensors 265. The processor module 225*a* includes a device context determination controller 330, a social context determination controller 335, a scoring controller 340, an execution controller 345, a display controller 350, and a sensor controller 360. Some or all of the elements of the client device 115 are in communication via bus or in any other useful way.

Figure 4:
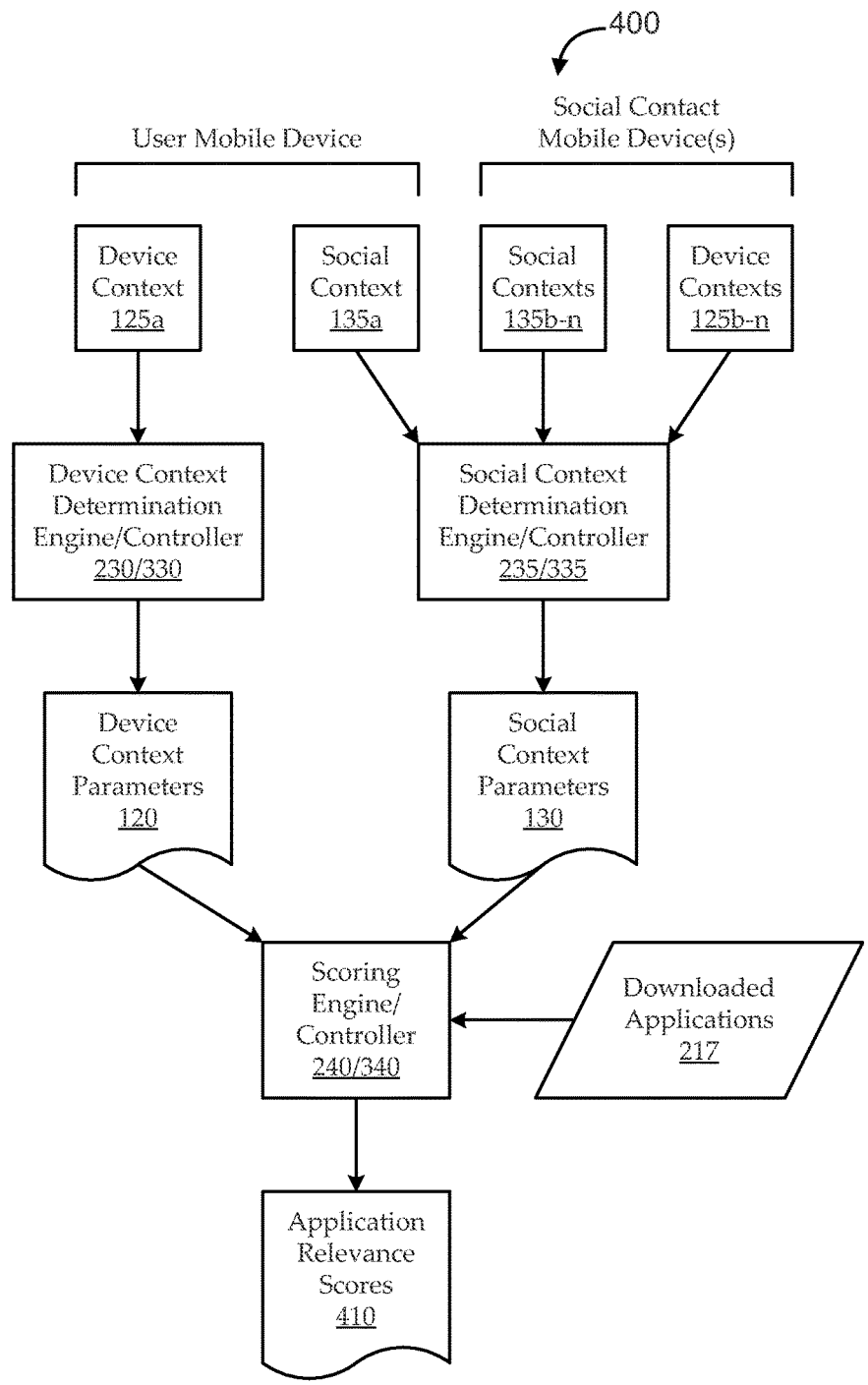
FIG. 4 shows a data flow diagram for illustrative application relevance scoring functionality.

FIG. 4 shows a data flow diagram 400 for illustrative application relevance scoring functionality. As described above with reference to FIG. 1, various types of context information are collected. For example, the sensor engine 260 monitors the one or more sensors 265 and/or application usage is monitored (e.g., by the processor module 225) to obtain device context 125 information for the user's client device 115 (e.g., client device 115a of FIG. 1). Social context 135 of the user's client device 115 can be obtained, for example, from social content of the user maintained by downloaded applications 217. Further, device context 125 of one or more social contact client devices 115 (e.g., client devices 115b-n of FIG. 1) and/or social context 135 of the one or more social contact client devices 115 can be obtained, for example, over the communications network 110 via the antenna 205 and the transceiver module 210.

The device context determination engine/controller 230/330 uses the user's device context 125 information to obtain (e.g., calculate, acquire, etc.) values of one or more device context parameters 120. The social context determination engine/controller 235/335 uses other context information to obtain values of one or more social context parameters 130. The device context parameters 120 and the social context parameters 130 are used by the scoring engine/controller 240/340 to calculate application relevance scores 410 for at least some of the downloaded applications 217.

Figure 5A:
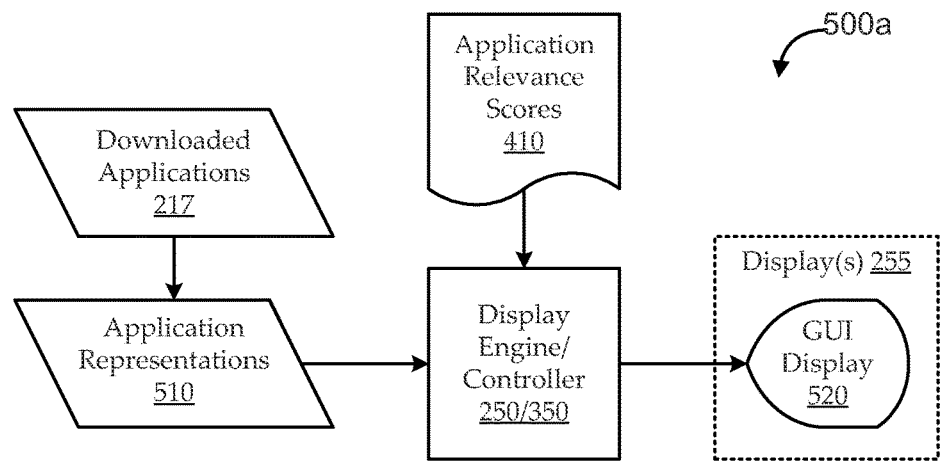
FIGS. 5A and 5B show data flow diagrams for illustrative uses of the application relevance scoring functionality in context-aware application recommendation.
Figure 5B:
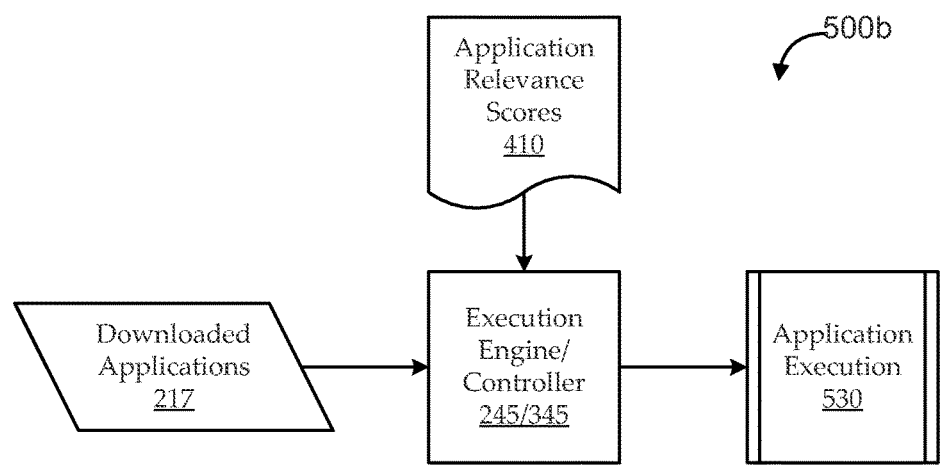

FIGS. 5A and 5B show data flow diagrams 500 for illustrative uses of the application relevance scoring functionality in context-aware application recommendation. Turning first to FIG. 5A, the display engine/controller 250/350 controls the GUI display 520 being displayed to one or more of the displays 255 of the client device 115. For example, each downloaded application 217 is associated with an application representation 510. Each application representation 510 may be an icon representing the downloaded application 217 and/or any other type of visualization of the downloaded application 217 on the display GUI 520. For example, a clock application may display as a digital or analog clock, a calendar application may display as a daily calendar view, a contact list may display as a set of icons representing each of the ten most recent contacts, etc.

The application relevance scores 410 determined in FIG. 4 are used by the display engine/controller 250/350 to affect how some or all of the application representations 510 are displayed to the GUI display 520. In one configuration, icons used as application representations 510 are rearranged, which may include adding icons to or removing icons from a GUI home screen. In another configuration a set of application visualizations is rearranged, which may include repositioning, resizing, adding, subtracting, reformatting, re-coloring, and/or otherwise affecting their display.

Turning to FIG. 5B, the execution engine/controller 245/345 controls application execution 530 of one or more of the downloaded applications 217. The application relevance scores 410 determined in FIG. 4 are used by the execution engine/controller 245/345 to determine whether to automatically execute and/or halt execution of one or more downloaded applications 217. For example, an application may be executed automatically when a user is in proximity to a restaurant that was recently recommended by one of the user's social contacts.

Figures 6A, 6B:
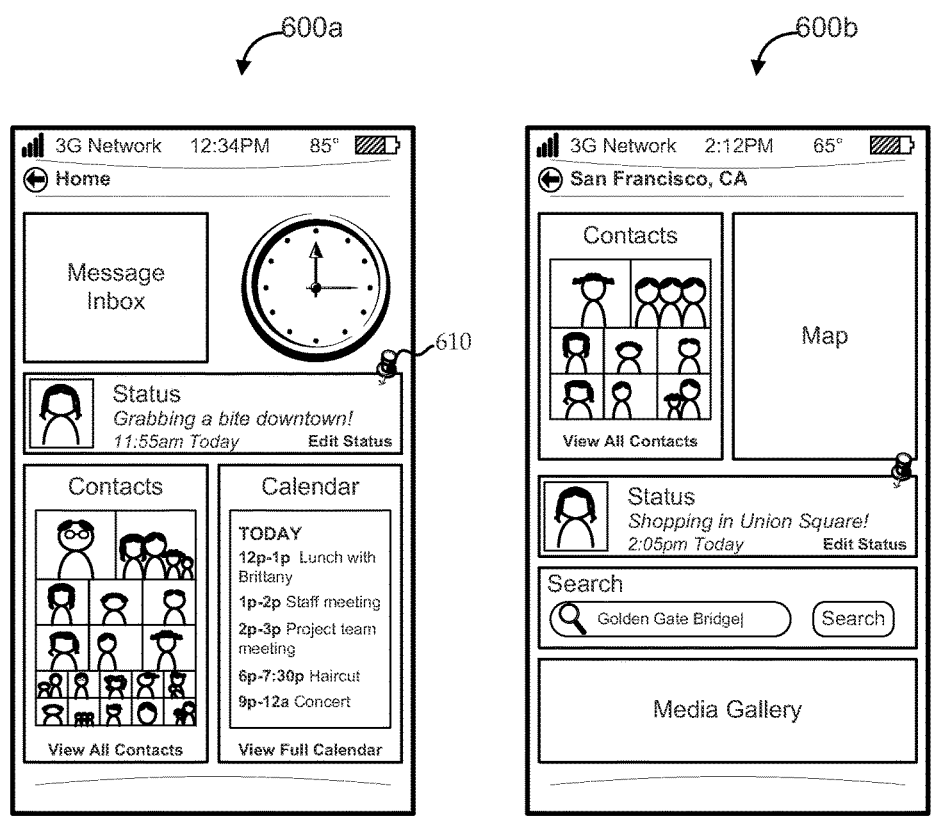
FIG. 6A shows an illustrative screenshot of the "home screen" GUI display on a user's mobile client device while at the user's home.
FIG. 6B shows an illustrative screenshot of the "home screen" GUI display on a user's mobile client device while the user is traveling to San Francisco, Calif.

It will be appreciated that many scenarios are possible in which a combination of device context and social context can be used to determine application relevance. One such scenario is illustrated by FIGS. 6A and 6B. FIG. 6A shows an illustrative screenshot 600a of the "home screen" GUI display (e.g., GUI display 520 of FIG. 5A) on a user's mobile client device while at the user's home. As illustrated, while at home, the user's home screen shows a number of application representations for downloaded applications, including "Message Inbox," clock, "Status," "Contacts," and "Calendar" applications.

In the illustrated scenario, it has been determined by application relevance determinations that the user is likely to interface with messaging and communications functions (through the inbox and contacts applications), to want to know the current time and upcoming schedule entries, and to constantly update a status entry (e.g., to a blog, a social networking site, etc.). Notably, the "Contacts" application representation is configured to show entries from the user's contact list that are most likely to be contacted from the home location. For example, these may be the social contacts with whom the user has most recently communicated by phone, email, SMS, etc.

In certain configurations, one or more applications (or application representations) can be "pinned," which can subject the application representation to certain pinning preferences. In FIG. 6A, the "Status" application is pinned, as illustrated by the "pin" icon 610. Pinning may typically be used to limit the affect of dynamic context-aware application recommendations on behavior of a particular application representation. For example, as described with reference to FIG. 5A, display of application representations can be affected (e.g., resized, rearranged, reordered, removed, etc.) according to the application relevance scores. In one exemplary configuration, pinning an application representation causes the application representation to be completely fixed, such that display of the application representation cannot be affected by changes in application relevance scores.

In other exemplary configurations, pinning an application representation causes the application representation to be substantially fixed, such that display of the application representation is relatively unaffected by changes in application relevance scores. For example, changes in application relevance scores may cause the application representation to change position and/or size, but always to remain on the home screen of the GUI display. In still other exemplary configurations, pinning an application representation causes the application representation to affected by changes in application relevance scores according to a different formula, a different weighting, different thresholds, etc. (e.g., as implemented by the scoring engine/controller 240/340).

In certain exemplary configurations, the same or different pinning preferences may be set for each application (or application representation). For example, a certain preferences page of the GUI display may allow pinning to be applied to a particular application representation, and an advanced "pinning preferences" page may be provided for all pinned applications or for each pinned application to allow customized pinning preferences to be set. As will be appreciated from the above descriptions of exemplary pinning configurations, the pinning preferences may allow the user to set allowed magnitudes of change in resizing, repositioning, etc. according to changes in application relevance scores.

Turning to FIG. 6B, an illustrative screenshot 600b is shown of the "home screen" GUI display (e.g., GUI display 520 of FIG. 5A) on a user's mobile client device while the user is traveling to San Francisco, Calif. As illustrated, while traveling, the user's home screen shows a number of application representations for downloaded applications, including "Contacts," "Map," "Status," "Search," and "Media Gallery" applications. In the illustrated scenario, it has been determined by application relevance determinations that the user is likely to interface with local contacts, that the user will want to search for local attractions (e.g., using the "Search" and "Map" applications), to continue to update status entries (e.g., to a blog, a social networking site, etc.), and to keep tabs on vacation photos being collected in the "Media Gallery."

Notably, the "Contacts" application representation is configured to show entries from the user's contact list that are most likely to be contacted from the travel location. For example, these may include social contacts with whom the user has recently communicated, social contacts determined to be in proximity according to their respective device contexts, social contacts that have recently posted information about San Francisco to a social networking site according to their respective social context information, etc. Accordingly, the set of contacts shown in FIG. 6B may be different from the set of contacts shown in FIG. 6A.

In addition to repositioning and/or resizing certain application representations, and even modifying the displayed content included in application representations (e.g., as described with reference to the Contacts application), certain applications may be executed and/or terminated. For example, in moving from FIG. 6A to FIG. 6B, it is apparent that the Message Inbox, Clock, and Calendar application representations are removed from the home screen of the GUI display, while the Map, Search, and Media Gallery application representation are added to the home screen of the GUI display. In some cases, execution of the corresponding applications is unaffected, and changes in application relevance scores only affects whether and how the application representations are displayed. In other cases, changes in the application relevance scores causes applications to be automatically executed (e.g., startup, move to the foreground, actively update, etc.), or causes execution of an application to automatically halt (e.g., to pause, shut down, move to a background process, etc.). For example, when the user moves to San Francisco, a Map application may automatically execute and download information to be displayed as part of the application representation.

It is assumed for the illustrative scenario of FIGS. 6A and 6B that the user enjoys updating the Status application both while at home and while traveling. Accordingly, the user has pinned the Status application (shown as pin 610). When the user moves from the home location (illustrated in FIG. 6A) to San Francisco (illustrated in FIG. 6B), all the application representations on the display GUI except the Status application representation have changed. For example, they have either been repositioned, like the Contacts application representation; removed, like the Message Inbox, Clock, and Calendar application representations; or added, like the Map, Search, and Media Gallery application representation. The pinned Status application representation, however, remains substantially unaffected. While Status application representation has moved to accommodate other changes to the GUI display, it has remained in the same general location and at the same general size.

It will be appreciated that descriptions and claims herein that refer to "downloaded applications" intend broadly to include functionality, including applications or certain functionality of applications, resident on the client device 115. In some examples, "downloaded applications" include client device 115 settings (e.g., ring volume, number of contacts displayed, screen brightness, etc.) that may be affected, for example, by location, proximity to certain social contacts, and/or other device or social context information. In other examples, "downloaded applications" include client side functionality of client-server applications, like portal functionality for web-based or other types of applications.

According to some exemplary configurations, the "downloaded applications" include templates and related templating functionality. Rather than using context-based application relevance determinations to apply application relevance scores directly on an application-by-application basis, the application relevance scores may be used to select a particular template. For example, referring to FIGS. 6A and 6B, each of "Home" and "Travel" may correspond to a template. The application representations within the template may be wholly or partially dictated by the template.

For example, when the user travels to San Francisco, device context information (e.g., GPS location) and/or social context information (e.g., a calendar entry indicating travel) may cause the "Travel" template to be selected. Once in San Francisco, social context information may indicate that a nearby restaurant was recently recommended by a social contact. Accordingly, a social networking application, map, restaurant review site, restaurant website, etc. may appear on the home screen within the parameters of the template.

As described above, device context information and/or social context information can be used to suggest (e.g., even to automatically execute) applications. According to certain embodiments, device context information and/or social context information can also be used to suggest templates over time. For example, the client device 115 recognizes over time that, roughly three days prior to traveling, the user tends to look at restaurant recommendation websites for restaurants in the vicinity of the hotel where she has a reservation, to call business contacts local to her travel destination, and to look at five-day weather forecasts for her travel destination city. The client device 115 may recommend some or all of those applications (e.g., by moving their respective application representations to the home screen) and/or the client device 115 may recommend a template having a useful display configuration that includes some or all of those application representations.

As described above, configurations use both device context information and social context information to generate application relevance scores, which can then be used to affect display and/or execution of applications. There are many different types of device and social context information, these types of information can be used in a number of different ways to affect application relevance scores. While some of these ways are presented herein, it will be appreciated that many other ways are possible; the specific scenarios are provided only as examples and should not be construed as limiting the scope of the disclosure or the claims.

One type of device context is a current geographical location of the client device 115. For example, a user may be more likely to use certain applications, templates, etc. when at predefined locations (e.g., home, primary office, remote office, social contact home or office, vacation destination, etc.) or other destinations (e.g., as detected by a GPS locator or other technique). Another type of device context is a current network usage of the client device 115. For example, the user may interact with certain applications, settings, etc. in certain ways according to whether the user is participating in an active call, downloading streaming data, having network performance issues (e.g., high bit error rates), attached to a public or private subnet, etc. Yet another type of device context is a current application usage of the client device 115. For example, certain applications may be more desirable while the user is composing an email, taking or editing a photograph, listening to music, using navigation functionality, etc. Still another type of device context is a current time of the client device 115. For example, different applications may tend to get used at different times of day (e.g., productivity applications during work hours versus media applications in the evening), on different days of the week (e.g., calendar and work enterprise email during the work week versus social networking and media applications on weekends), at different times of year, etc.

Some other types of device context information may relate to historical and/or relative context. One such type of device context is a current geographical location of the client device 115 in relation to a past geographical location of the mobile device. Another such type of device context is current application usage of the client device 115 in relation to past application usage.

Turning to illustrative types of social context information, one type of social context is an entry in a calendar application of the client device 115 associated with the user. For example, calendar entries may indicate when and to where the user is traveling, when and with which social contacts the user has a meeting, when lifecycle events (e.g., birthdays, weddings, anniversaries, etc.) of social contacts are occurring, etc. Another type of social context is a contact history of the client device 115. For example, on a friend's birthday (e.g., according to the user's calendar, a social networking site, or a contact listing) if the user always tends to call a particular friend and post a birthday message on the friend's social networking page, the Contacts application representation may be automatically adjusted to move the friend's contact icon near the top of the list, and the Social Networking application may execute such that its application representation is displayed in the home screen of the display GUI. Some other illustrative types of social context include an entry in a calendar application associated with a social contact, an update received via a social networking application, application usage information contextualized according to geographic location of a social contact, application usage information contextualized according to application usage of a social contact, current geographical location of the mobile device in relation to geographical location of a social contact, etc.

It is worth noting that some configurations use context-aware functionality to affect intra-application functionality. For example, the Contacts application described with reference to FIGS. 6A and 6B orders and/or displays contacts differently according to device and/or social context. Many other illustrative scenarios are possible.

According to one such illustrative scenario, suppose a user ("Eric") is looking for a new restaurant to take his wife for their anniversary. He could look on restaurant review sites, but there are always so many, and he doesn't know which ones are reliable or would align with his opinions. Device and social context information can be used to determine intra-application relevance (e.g., types of restaurants he frequently visits, friends that also go to those restaurants, etc.) to pull recommendations and supplementary information that would provide him with more customized results. For example, recommendations of relevant locations could be prioritized when his social contacts have also posted reviews and/or photos of that restaurant on a social networking site. Eric's very closest friends may even allow him to view restaurants they have been to as detected by GPS fixes. Contact histories could indicate which are Eric's closer social contacts, and recommendations from those contacts could be weighted more heavily. Similarly, since there are some restaurants to which Eric's friends may have not been, people who have similar profiles to Eric could supplement recommendations.

According to another illustrative scenario, another user ("Mandy") is planning a happy hour with her coworkers. Knowing which contacts Mandy is inviting and the type of event it will be (e.g., happy hour, dinner, movies, etc.), techniques described herein can be used to provide location suggestions for that event. These suggestions could take into consideration more convenient locations (e.g., by location-based profiles or manual calendar input) for selected social contacts, places each coworker has been to and/or likes, and places the group of coworkers has been together in the past.

Figure 7:
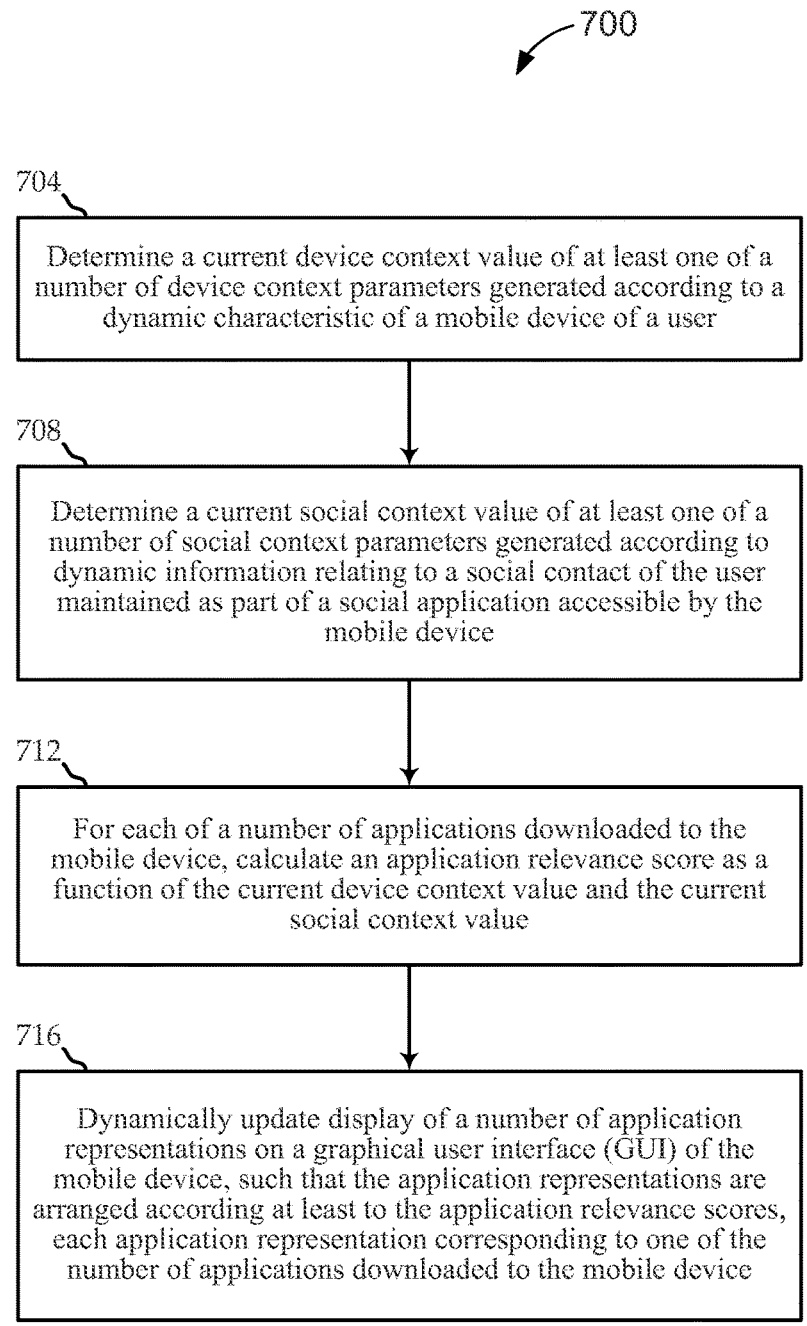
FIG. 7 shows a flow diagram of an exemplary method for dynamically affecting display of application representations according to both device- and social-contextual information.
Figure 8:
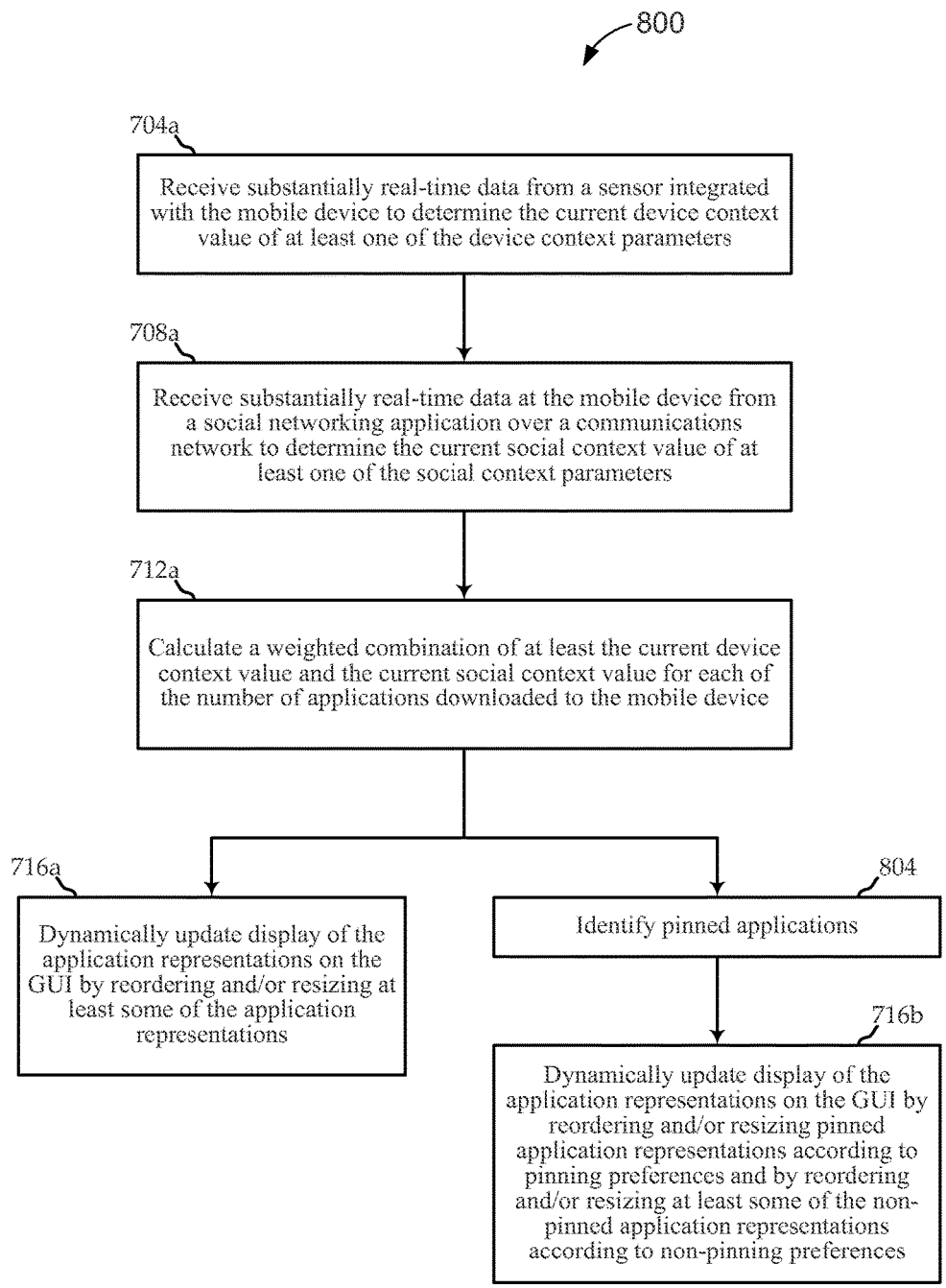
FIG. 8 shows a flow diagram of a method that represents several illustrative embodiments of the method of FIG. 7.
Figure 9:
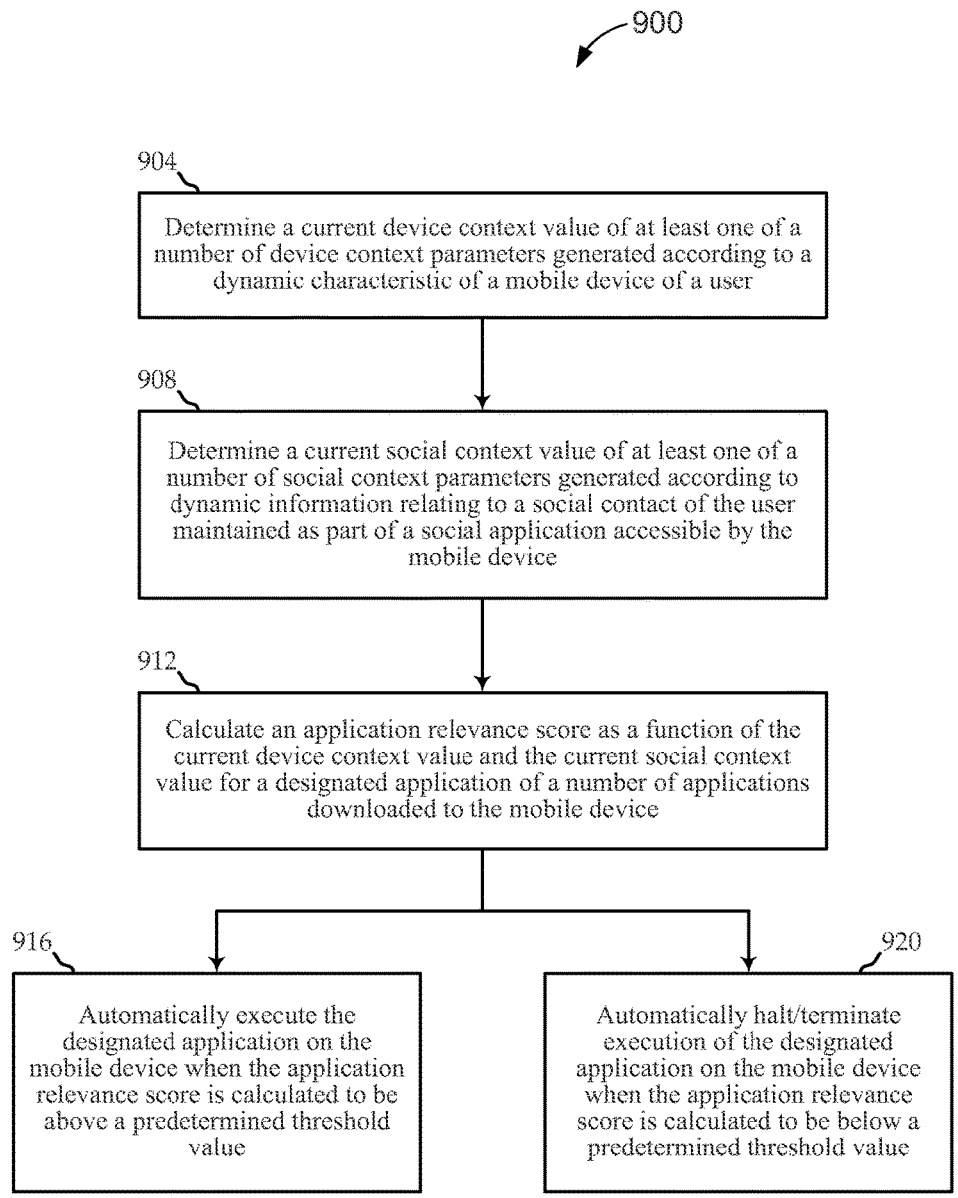
FIG. 9 shows a flow diagram of an exemplary method for automatically affecting execution of applications according to both device- and social-contextual information.

Functionality described above with reference to various systems are further described through methods of FIGS. 7-9. Turning first to FIG. 7, a flow diagram is shown of an exemplary method 700 for dynamically affecting display of application representations according to both device- and social-contextual information. The method 700 begins at stage 704 by determining a current device context value of at least one of a number of device context parameters generated according to a dynamic characteristic of a mobile device (client device 115) of a user. As discussed above, the device context value can be determined in a number of ways, including by using sensors and/or other substantially real-time data sources.

At stage 708, a current social context value is determined for at least one of a number of social context parameters generated according to dynamic information relating to a social contact of the user maintained as part of a social application accessible by the mobile device. As discussed above, the social context values may be determined from one or more of a number of sources, including social context information local to the user's client device 115, social context information from a social contact's client device 115, or device context information from a social contact's client device 115. The device and/or social context values may each represent a value from a single source or a combination of values from multiple sources.

At stage 712, for each application downloaded to the mobile device, an application relevance score is calculated as a function of the current device context value and the current social context value. As discussed above, the application relevance scores may be calculated for all applications or only a portion of the applications. Further, as discussed above, the "downloaded applications" may include client portions of a client-server application, template applications that affect multiple application representations, etc.

Typically, the application relevance score for a particular application is a linear, non-linear or weighted combination of a numerical representation of various device and social context values. For illustrative purposes, suppose that the following device and social context values are recorded a number of applications on the client device 115: Frequency with which the user has interacted with the application at or near the current time ($c_1$); frequency with which the user has interacted with the application at or near the current day of week ($c_2$); frequency with which the user has interacted with the application at or near the current location ($c_3$); frequency with which the user has interacted with the application when some or all social contacts are present nearby (e.g., using photo albums or camera applications when near other people) ($c_4$); a score correlating the probability of usage of the application with current user activity (e.g., using a heart rate monitor or pedometer application while running, etc.) ($c_5$); a score correlating the probability of application usage with a particular type of event on the calendar (e.g., using a SMS application during work meetings, or status update application at a party) ($c_6$); and a score correlating the probability of application usage with the user being at a new location (e.g., using a Maps application in a new place in town or elsewhere) (c7). The application relevance score may then be calculated as a function of those values (e.g., $S=f(c1, c2, c3, c4, \ldots cn)$).

At stage 716, display of a number of application representations on a GUI of the mobile device is dynamically updated. The dynamic update causes application representations to be arranged according at least to the application relevance scores. For example, various application representations may be resized, repositioned, re-colored, added, removed, etc.

FIG. 8 shows a flow diagram of a method 800 that represents several illustrative embodiments of the method 700 of FIG. 7 for dynamically affecting display of application representations according to both device- and social-contextual information. Stages of the method 800 of FIG. 8 are numbered in a similar manner to corresponding stages of the method 700 of FIG. 7. Accordingly, the method 800 begins at stage 704a by receiving substantially real-time data from a sensor integrated with the mobile device to determine the current device context value of at least one of the device context parameters.

At stage 708a, substantially real-time data is received at the mobile device from a social networking application over a communications network to determine the current social context value of at least one of the social context parameters. At stage 712a, a weighted combination of at least the current device context value and the current social context value for each of the plurality of applications downloaded to the mobile device is calculated to yield application relevance scores. According to one exemplary configuration, as in FIG. 7, display of the application representations on the GUI is dynamically updated by reordering and/or resizing at least some of the application representations at stage 716a.

Alternatively, at stage 804, one or more pinned applications are identified. As described above, applications may be pinned by a user, and pinned applications may be associated with certain pinning parameters (e.g., predefined, default, user-defined, and/or other parameters). At stage 716b, display of the application representations on the GUI is dynamically updated accounting for the application pinning. For example, pinned application representations are reordered and/or resized according to pinning preferences, while non-pinned application representations are reordered and/or resized according to non-pinning preferences.

FIG. 9 shows a flow diagram of an exemplary method 900 for automatically affecting execution of applications according to both device- and social-contextual information. The method 900 begins at stage 904 by determining a current device context value of at least one of a number of device context parameters generated according to a dynamic characteristic of a mobile device of a user. At stage 908, a current social context value is determined for at least one of a number of social context parameters generated according to dynamic information relating to a social contact of the user maintained as part of a social application accessible by the mobile device.

At stage 912, an application relevance score is calculated as a function of the current device context value and the current social context value for a designated application downloaded to the mobile device. For example, stages 904, 908, and 912 may be implemented substantially as described with reference to stages 704, 708, and 712 of FIG. 7, respectively. At stage 916, the designated application is automatically executed on the mobile device when the application relevance score is calculated to be above a predetermined threshold value. For example, the application automatically executes when the application relevance score for the designated application is calculated to be above a certain numerical value, to have a certain magnitude of change over a certain amount of time, to be a certain amount higher than certain other application relevance scores, etc. Alternatively, at stage 920, execution of the designated application may be automatically halted or terminated on the mobile device when the application relevance score is calculated to be below a predetermined threshold value.

The various operations of methods described above may be performed by any suitable means capable of performing the corresponding functions. The means may include various hardware and/or software component(s) and/or module(s), including, but not limited to a circuit, an application specific integrate circuit (ASIC), or processor.

The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM, and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material.

Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method comprising:
   determining, based on a dynamic characteristic of a mobile device of a user, a current device context value of at least one of a plurality of device context parameters;
   receiving, at the mobile device and over a communications network, context information from each client device of a plurality of client devices, wherein each client device corresponds to a different social contact of a plurality of social contacts of the user, wherein the context information received from each client device comprises information relating to a social context of the client device of the social contact, wherein the information relating to the social context of the client device of the social contact relates to historical application usage information of a plurality of applications of the client device of the social contact;
   determining, based on the context information received from each client device of the plurality of social contacts of the user, a current social context value of at least one of a plurality of social context parameters;
   for each of a plurality of applications previously downloaded and stored on the mobile device, calculating, by the mobile device, an application relevance score as a function of the current device context value and the current social context value;
   identifying at least one of the plurality of applications downloaded to the mobile device as a pinned application; and
   dynamically updating a display of a plurality of application representations on a graphical user interface (GUI) of the mobile device, such that the application representations are arranged according at least to the application relevance scores, each application representation corresponding to one of the plurality of applications downloaded to the mobile device, the arranging comprising removing at least one application representation of the plurality of application representations according to a frequency of use of each of the plurality of application representations, reordering one or more application representations of the plurality of application representations according to the frequency of use of each such application representation, and listing an application representation corresponding to a most recently used application of the plurality of applications downloaded to the mobile device in a user-designated location of the GUI for the most recently used application, wherein the arrangement of the application representation of the pinned application is fixed and is not affected by changes in the application relevance scores.

2. The method of claim 1, wherein calculating the application relevance score comprises calculating a weighted combination of at least the current device context value and the current social context value for each of the plurality of applications downloaded to the mobile device.

3. The method of claim 1, wherein determining the current device context value comprises determining the current device context value based on substantially real-time data received from a sensor integrated with the mobile device.

4. The method of claim 1, wherein the at least one device context parameter relates to at least one of:
   current geographical location of the mobile device;
   current network usage;
   current application usage; or
   current time.

5. The method of claim 1, wherein the at least one device context parameter relates to at least one of:
   current geographical location of the mobile device in relation to a past geographical location of the mobile device; or current application usage in relation to past application usage.

6. The method of claim 1, wherein determining the current social context value comprises determining the current social context value based on at least one of:
an entry in a calendar application associated with the user; or
contact history.

7. The method of claim 1, wherein the context information client device of the social contact relates to a geographic location of the client device of the social contact in relation to a geographic location of the mobile device.

8. The method of claim 1, wherein dynamically updating the display of the plurality of application representations on the GUI of the mobile device comprises reordering at least some of the application representations.

9. The method of claim 1, wherein dynamically updating the display of the plurality of application representations on the GUI of the mobile device comprises resizing at least some of the application representations.

10. The method of claim 1, wherein:
the method further comprises displaying the GUI on a primary screen and at least one secondary screen; and
dynamically updating the display of the plurality of application representations on the GUI comprises:
determining a subset of the plurality of applications downloaded to the mobile device that have highest application relevance scores; and
arranging the application representations according at least to the application relevance scores by displaying the application representations corresponding to the subset of applications on the primary screen of the GUI.

11. The method of claim 1, further comprising:
automatically executing at least one of the plurality of applications stored on the mobile device based on the calculated application relevance scores.

12. The method of claim 1, wherein at least one application representation is an icon representing the corresponding application.

13. The method of claim 1, further comprising:
determining a predicted future context based on the current device context value and the current social context value;
associating at least one of the plurality of applications downloaded to the mobile device with a template associated with the predicted future context; and
dynamically updating the display of the plurality of application representations on the GUI according to the template associated with the predicted future context.

14. The method of claim 1 wherein the context information client device of the social contact relates to calendar entries of the social contact.

15. The method of claim 1, further comprising:
determining a proximity of the mobile device to the client device of a social contact; and wherein calculating the application relevance score as a function of the current device context value and the current social context value further comprises calculating the application relevance score based at least in part on the proximity of the mobile device to the client device of the social contact.

16. A system comprising:
a display;
a memory configured to store a plurality of application representations, each corresponding to one of a plurality of applications downloaded to a mobile device of a user; and
a processor communicatively coupled to the memory and the display, the processor being configured to implement a plurality of engines, the engines comprising:
a device context determination engine configured to determine, based on a dynamic characteristic of the mobile device of the user, a current device context value of at least one of a plurality of device context parameters;
a social context determination engine configured to receive, over a communications network, context information from each client device of a plurality of client devices, wherein each client device corresponds to a different social contact of a plurality of social contacts of the user, wherein the context information received from each client device comprises information relating to a social context of the client device of the social contact, wherein the information relating to the social context of the client device of the social contact relates to historical application usage information of a plurality of applications of the client device of the social contact, and to determine a current social context value of at least one of a plurality of social context parameters based on the context information received from each client device of the social contacts of the user;
a scoring engine, communicatively coupled to the device context determination engine and the social context determination engine, and configured to calculate, for each of the plurality of applications previously downloaded and stored on the mobile device, an application relevance score as a function of the current device context value and the current social context value; and
a display engine, communicatively coupled to the data store, the scoring engine, and the display, and configured to identify at least one of the plurality of applications downloaded to the mobile device as a pinned application, and dynamically update the display to show at least some of the plurality of application representations on a graphical user interface (GUI) rendered at the display, such that the application representations are arranged according at least to the application relevance scores, the arranging comprising removing at least one application representation of the plurality of application representations according to a frequency of use of each of the plurality of application representations, reordering one or more application representations of the plurality of application representations according to the frequency of use of each such application representation, and listing an application representation corresponding to a most recently used application of the plurality of applications downloaded to the mobile device in a user-designated location of the GUI for the most recently used application, wherein the arrangement of the application representation of the pinned application is fixed and is not affected by changes in the application relevance scores.

17. The system of claim 16, further comprising a sensor integrated with the mobile device, wherein the device context determination engine is further configured to determine the current device context value based on substantially real-time data received from the sensor.

18. The system of claim 16, wherein the display engine is configured to:
display the GUI on a primary screen and at least one secondary screen; and
dynamically update the display of the plurality of application representations on the GUI by:

determining a subset of the plurality of applications downloaded to the mobile device that have highest application relevance scores; and arranging the application representations according at least to the application relevance scores by displaying the application representations corresponding to the subset of applications on the primary screen of the GUI.

19. The system of claim 16, wherein the display engine is configured to automatically execute at least one of the plurality of applications stored on the mobile device based on the calculated application relevance scores.

20. The system of claim 16, wherein the context information for the client device of the social contact relates to social content posted to the social networking application by the social contact of the user via the client device of the social contact.

21. The system of claim 16, wherein:
the scoring engine is further configured to determine a predicted future context based on the current device context value and the current social context value; and
the display engine is further configured to associate at least one of the plurality of applications downloaded to the mobile device with a template associated with the predicted future context and to dynamically update the display of the plurality of application representations on the GUI according to the template associated with the predicted future context.

22. A mobile device comprising:
a display;
a memory; and
a processor communicatively coupled to the display and the memory, the processor being configured to implement a plurality of controllers, the controllers comprising:
a device context determination controller configured to determine, based on a dynamic characteristic of the mobile device, a current device context value of at least one of a plurality of device context parameters, wherein the mobile device is associated with a user;
a social context determination controller configured to receive, over a communications network, context information from each client device of a plurality of client devices, wherein each client device corresponds to a different social contact of a plurality of social contacts of the user, wherein the context information received from each client device comprises information relating to a social context of the client device of the social contact, and wherein the information relating to the social context of the client device of the social contact relates to historical application usage information of a plurality of applications of the client device of the social contact, and to determine a current social context value of at least one of a plurality of social context parameters based on the context information received from each client device of the plurality of social contacts of the user;
a scoring controller, communicatively coupled to the device context determination controller and the social context determination controller, and configured to calculate, for each of the plurality of applications previously downloaded and stored on the mobile device, an application relevance score as a function of the current device context value and the current social context value; and
a display controller, communicatively coupled to the scoring controller and the display, and configured to identify at least one of the plurality of applications downloaded to the mobile device as a pinned application, and dynamically update the display to show at least some of a plurality of application representations on a graphical user interface (GUI) rendered at the display, such that the application representations are arranged according at least to the application relevance scores, each application representation corresponding to one of the plurality of applications downloaded to the mobile device, the arranging comprising removing at least one application representation of the plurality of application representations according to a frequency of use of each of the plurality of application representations, reordering one or more application representations of the plurality of application representations according to the frequency of use of each such application representation, and listing an application representation corresponding to a most recently used application of the plurality of applications downloaded to the mobile device in a user-designated location of the GUI for the most recently used application, wherein the arrangement of the application representation of the pinned application is fixed and is not affected by changes in the application relevance scores.

23. The mobile device of claim 22, further comprising a sensor integrated with the mobile device, wherein the device context determination controller is further configured to determine the current device context value based on substantially real-time data received from the sensor.

24. The mobile device of claim 22, wherein the display controller is further configured to:
display the GUI on a primary screen and at least one secondary screen; and
dynamically update the display of the plurality of application representations on the GUI by:
determining a subset of the plurality of applications downloaded to the mobile device that have highest application relevance scores; and
arranging the application representations according at least to the application relevance scores by displaying the application representations corresponding to the subset of applications on the primary screen of the GUI.

25. The mobile device of claim 22, wherein the display controller is configured to automatically execute at least one of the plurality of applications stored on the mobile device based on the calculated application relevance scores.

26. The system of claim 22, wherein the context information for the client device of the social contact relates to social content posted to the social networking application by the social contact of the user via the client device of the social contact.

27. The system of claim 22, wherein:
the scoring controller is further configured to determine a predicted future context based on the current device context value and the current social context value; and
the display controller is further configured to associate at least one of the plurality of applications downloaded to the mobile device with a template associated with the predicted future context and to dynamically update the display of the plurality of application representations on the GUI according to the template associated with the predicted future context.

28. A computer program product residing on a non-transitory processor-readable medium and comprising processor-readable instructions, which, when executed, cause a processor to perform steps comprising:

determining, based on a dynamic characteristic of a mobile device of a user, a current device context value of at least one of a plurality of device context parameters;

receiving, at the mobile device and over a communications network, context information from each client device of a plurality of client devices, wherein each client device corresponds to a different social contact of a plurality of social contacts of the user, wherein the context information comprises information relating to a social context of the client device of the social contact, and wherein the information relating to the social context of the client device of the social contact relates to historical application usage information of a plurality of applications of the client device of the social contact;

determining, based on the context information received from each client device of the plurality of social contacts of the user, a current social context value of at least one of a plurality of social context parameters;

for each of a plurality of applications previously downloaded and stored on the mobile device, calculating an application relevance score as a function of the current device context value and the current social context value;

identifying at least one of the plurality of applications downloaded to the mobile device as a pinned application; and dynamically updating a display of a plurality of application representations on a graphical user interface (GUI) of the mobile device, such that the application representations are arranged according at least to the application relevance scores, each application representation corresponding to one of the plurality of applications downloaded to the mobile device, the arranging comprising removing at least one application representation of the plurality of application representations according to a frequency of use of each of the plurality of application representations, reordering one or more application representations of the plurality of application representations according to the frequency of use of each such application representation, and listing an application representation corresponding to a most recently used application of the plurality of applications downloaded to the mobile device in a user-designated location of the GUI for the most recently used application, wherein the arrangement of the application representation of the pinned application is fixed and is not affected by changes in the application relevance scores.

29. The computer program product of claim 28, wherein the instructions are further configured to cause the processor to calculate a weighted combination of at least the current device context value and the current social context value for each of the plurality of applications downloaded to the mobile device.

30. The computer program product of claim 28, wherein the instructions are further configured to cause the processor to determine the current device context value based on substantially real-time data received from a sensor integrated with the mobile device.

31. The computer program product of claim 28, wherein the instructions are further configured to cause the processor to:

display the GUI on a primary screen and at least one secondary screen; and dynamically update the display of the plurality of application representations on the GUI by:

determining a subset of the plurality of applications downloaded to the mobile device that have highest application relevance scores; and arranging the application representations according at least to the application relevance scores by displaying the application representations corresponding to the subset of applications on the primary screen of the GUI.

32. The computer program product of claim 28, wherein the instructions are further configured to cause the processor to:

automatically execute at least one of the plurality of applications stored on the mobile device based on the calculated application relevance scores.

33. The computer program product of claim 28, wherein the context information client device of the social contact relates to social content posted to the social networking application by the social contact of the user via the client device of the social contact.

34. The computer program product of claim 28, wherein the instructions are further configured to cause the processor to:

determine a predicted future context based on the current device context value and the current social context value;

associate at least one of the plurality of applications downloaded to the mobile device with a template associated with the predicted future context; and dynamically update the display of the plurality of application representations on the GUI according to the template associated with the predicted future context.

35. A system comprising:

means for determining, based on a dynamic characteristic of a mobile device of a user, a current device context value of at least one of a plurality of device context parameters;

means for receiving, at the mobile device and over a communications network, context information from each client device of a plurality of client devices, wherein each client device corresponds to a different social contact of a plurality of social contacts of the user, wherein the context information received from each client device comprises information relating a social context of the client device of the social contact, and wherein the information relating to the social context of the client device of the social contact relates to historical application usage information of a plurality of applications of the client device of the social contact;

means for determining, based on the context information received from each client device of the plurality of social contacts of the user, a current social context value of at least one of a plurality of social context parameters;

for each of a plurality of applications previously downloaded and stored on the mobile device, means for calculating an application relevance score as a function of the current device context value and the current social context value;

means for identifying at least one of the plurality of applications downloaded to the mobile device as a pinned application; and means for dynamically updating a display of a plurality of application representations on a graphical user interface (GUI) of the mobile device, such that the application representations are arranged according at least to the application relevance scores, each application representation corresponding to one of the plurality of applications downloaded to the mobile device, the arranging comprising removing at least one application representation of the plurality of application representations according to a frequency of use of each of the plurality of application representations, reordering one or more application representations of the plurality of application representations according to the frequency of use of each such application representation, and listing an application representation corresponding to a most recently used application of the plurality of applications downloaded to the mobile device in a user-designated location of the GUI for the most recently used application, wherein the arrangement of the application representation of the pinned application is fixed and is not affected by changes in the application relevance scores.

36. The system of claim 35, wherein the means for calculating the application relevance score comprises means for calculating a weighted combination of at least the current device context value and the current social context value for each of the plurality of applications downloaded to the mobile device.

37. The system of claim 35, wherein the means for determining the current device context value comprises means for determining the current device context value based on substantially real-time data received from a sensor integrated with the mobile device.

38. The system of claim 35, wherein:
the system further comprises means for displaying the GUI on a primary screen and at least one secondary screen; and
the means for dynamically updating the display of the plurality of application representations on the GUI comprises:

means for determining a subset of the plurality of applications downloaded to the mobile device that have highest application relevance scores; and
means for arranging the application representations according at least to the application relevance scores by displaying the application representations corresponding to the subset of applications on the primary screen of the GUI.

39. The system of claim 35, further comprising:
means for automatically executing at least one of the plurality of applications stored on the mobile device based on the calculated application relevance scores.

40. The system of claim 35, wherein the context information for the client device of the social contact relates to social content posted to the social networking application by the social contact of the user via the client device of the social contact.

41. The system of claim 35, further comprising:
means for determining a predicted future context based on the current device context value and the current social context value;
means for associating at least one of the plurality of applications downloaded to the mobile device with a template associated with the predicted future context; and
means for dynamically updating the display of the plurality of application representations on the GUI according to the template associated with the predicted future context.

* * * * *

UNITED STATES PATENT AND TRADEMARK OFFICE
CERTIFICATE OF CORRECTION

PATENT NO. : 9,781,540 B2
APPLICATION NO. : 13/177829
DATED : October 3, 2017
INVENTOR(S) : Padmapriya Jagannathan et al.

It is certified that error appears in the above-identified patent and that said Letters Patent is hereby corrected as shown below:

In the Claims

Claim 26, Column 26, Line 48, "The system of claim 22," should be changed to
-- The mobile device of claim 22, --

Claim 27, Column 26, Line 53, "The system of claim 22," should be changed to
-- The mobile device of claim 22, --

Signed and Sealed this
Twelfth Day of December, 2017

Joseph Matal
*Performing the Functions and Duties of the
Under Secretary of Commerce for Intellectual Property and
Director of the United States Patent and Trademark Office*